United States Patent
You et al.

(10) Patent No.: US 7,862,447 B2
(45) Date of Patent: Jan. 4, 2011

(54) MATRIX COMPOSITE GOLF CLUB SHAFT AND MANDREL

(75) Inventors: Daniel You, 115 S. Arovista Cir., Brea, CA (US) 92821; Sung G. Jeong, Kum Chon Dong (KR)

(73) Assignee: Daniel You, Anaheim, CA (US)

( * ) Notice: Subject to any disclaimer, the term of this patent is extended or adjusted under 35 U.S.C. 154(b) by 0 days.

(21) Appl. No.: 12/036,845

(22) Filed: Feb. 25, 2008

(65) Prior Publication Data

US 2009/0215550 A1    Aug. 27, 2009

(51) Int. Cl.
A63B 53/10    (2006.01)

(52) U.S. Cl. ..................................... 473/319

(58) Field of Classification Search .......... 473/316–323
See application file for complete search history.

(56) References Cited

U.S. PATENT DOCUMENTS

| | | | |
|---|---|---|---|
| 2,341,053 A | 2/1944 | Mason | |
| 3,995,856 A * | 12/1976 | Hollendorfer, Jr. | .......... 473/538 |
| 4,023,801 A | 5/1977 | VanAuken | |
| 4,157,181 A | 6/1979 | Cecka | |
| 5,326,099 A * | 7/1994 | Yamamoto et al. | .......... 473/315 |
| 5,368,729 A | 11/1994 | Stefkovich | |
| 5,429,008 A | 7/1995 | Matsumoto et al. | |
| 5,443,734 A | 8/1995 | Fetner et al. | |
| 5,472,612 A | 12/1995 | Maxwell | |
| 5,512,168 A | 4/1996 | Fetner et al. | |
| 5,529,694 A | 6/1996 | Strickler | |
| 5,683,914 A | 11/1997 | Miller et al. | |
| 5,874,004 A | 2/1999 | DeWitt | |
| 5,932,174 A | 8/1999 | Brayton et al. | |
| 2009/0011848 A1 * | 1/2009 | Thomas et al. | .............. 473/288 |

FOREIGN PATENT DOCUMENTS

| | | |
|---|---|---|
| DE | 19626355 | 1/1998 |
| GB | 325677 | 2/1930 |
| JP | 2001000607 | 1/2001 |
| JP | 2001000607 A * | 1/2001 |

OTHER PUBLICATIONS

English translation of JP2001000607A, published Jan. 9, 2001, in the name of Hakoda Shoji, assigned to Daio Shoji KK.

* cited by examiner

*Primary Examiner*—Stephen L. Blau
(74) *Attorney, Agent, or Firm*—Stetina Brunda Garred & Brucker; Lowell Anderson (57) ABSTRACT

A golf club shaft is provided that has a grip end opposite a head end and defining a length of the shaft extending between those two ends. The shaft has a tubular cross-section over at least one portion of the shaft length which cross-section has a substantially circular outer periphery and a polygon inner periphery formed of a plurality of between 4 and 24 flats, and preferably formed of 8-16 flats. A mandrel having the shape of the inner periphery of the shaft is also provided, as is a method of forming the shaft that uses the mandrel and composite matrix materials.

11 Claims, 6 Drawing Sheets

MATRIX COMPOSITE GOLF CLUB SHAFT AND MANDREL

BACKGROUND

Golf club shafts were historically made by turning lengths of wood on a lathe to form a tapered shaft with a round cross-section. But the wood was heavy and of variable stiffness, resulting in inconsistent performance and lower velocity at the golf club head. The wooden shafts were replaced with various tubular metal shafts such as steel and titanium which provided more consistent stiffness control and that, because of the lighter weight, provided a higher velocity at the golf club head. The metal shafts are now being replaced by tubular, composite matrix shafts which allow and even lighter and stiffer shaft than those made of metal. These matrix shafts are typically formed of a graphite epoxy matrix created either by winding a plurality of graphite strands, preferably in the form of unidirectional, pre-impregnated fiber tape in predetermined patterns around a tapered steel mandrel as in U.S. Pat. No. 4,157,181, or by, or by taking a sheet of previously laid-up strands and wrapping pre-cut segments around the tapered mandrel as in U.S. Pat. No. 4,023,801. The strands can be varied in size, spacing, material and orientation in order to vary the stiffness of the resulting tapered shaft. In both manufacturing methods, the graphite strands and mandrel are placed in an autoclave where high temperature and pressure bond the graphite and epoxy, or shrink-wrap plastic is placed around the mandrel and composite matrix and the assembly is baked in an oven to cure the matrix. The mandrel is then removed leaving a light, tubular shaft with a thin cross-section that is circular both outside and inside.

While the matrix composite is lighter than wood and metal, it has a uniform stiffness that does not vary in the radial direction.

BRIEF SUMMARY

It is believed possible to achieve a shaft with desirable stiffness and performance characteristics, and a potentially lighter shaft, by varying the inner periphery of the cross-section, as described herein. A shaft having improved, selectably variable and desirable stiffness is provided by varying the shape of the inside of the tapered tubular shaft of graphite matrix material, and in particular by providing a plurality of flats on the inner surface of the shaft. The bends formed in the matrix when the matrix bends over the corners of adjoining flats is believed to result in a localized stiffness increase along the length of the bend. A shaft with a cross-section having a polygon interior profile is believed to have higher bending strength, at least along certain planes, and a lower torsional resistance. Thus, a shaft is believed capable of having a lighter weight, increased stiffness, improved hoop strength and lower torque. By altering the bending stiffness of the shaft along the entire shaft length, or by altering the bending strength in any given region, the performance of the club head can be varied, and preferably varied to provide a lower backspin on the ball driven with such a club, resulting in a longer carry distance.

The shaft is achieved by using a mandrel having a plurality of flat sides along a length of the mandrel. The flats preferably extend for a substantial length of the shaft and preferably end before the head end of the shaft. A circular inner diameter of the shaft for about two or more inches from the head is believed desirable. From four to 24 sides are believed suitable, with 8-16 flat sides being preferred. Advantageously, the numbers of sides are multiples of two, and preferably multiples of four. The shafts made using the mandrel have a generally circular outer periphery, and preferably a substantially circular outer periphery with an inner periphery that has a series of flats corresponding to the flats on the mandrel. The cross-section is thus a generally circular on the outside and a polygon on the inside along the portion of the shaft corresponding to the flat-sided portion of the mandrel, but preferably with a circular inside diameter adjacent the head end of the shaft.

In a further embodiment, the flats extend along a first length extending from at or adjacent to the gripping end of the shaft toward a portion in the middle of the shaft, with a circular middle section and a second length of flats extending from the middle section toward the head end of the shaft but preferably changing to a circular section adjacent the head end of the shaft.

In more detail, there is advantageously provided a golf club shaft having a grip end opposite a head end and defining a length of the shaft extending between those two ends. The shaft has a tubular composite matrix shaft tapering from a larger grip end toward a smaller head end, the shaft having a cross-section over a first portion of the length which cross-section has a generally circular outer periphery and a polygon inner periphery formed of a plurality of between 4 and 24 flats.

This basic shaft can have numerous variations, including a preferred variation wherein the polygon has from 8 to 16 sides and is substantially circular. The shaft preferably has an even number of sides, and the first portion of the length preferably extends for a substantial length of the shaft, either continuously or intermittently. That substantial length can be achieved using one or more further portions of the length spaced apart from the first section, where the further portions have a cross-section which has a substantially circular outer diameter and a polygon inner periphery formed of a plurality of flats. Such further portions are separated by yet another portion of the shaft having a generally circular inner diameter. Still further variations include a shaft having a generally circular inner periphery and a substantially circular outer periphery adjacent the head end of the shaft. The inner periphery of the head end of the shaft can be configured to receive a post of a golf club head.

Advantageously, each flat has a width that narrows as the cross-section moves from the grip end of the first portion toward the head end of the first portion. Alternatively, each flat could have a constant width along its length. Further, it is believed advantageous if at least a plurality of the flats abut the adjacent flat at a sharp corner or a rounded corner, although such abutting corners could be rounded and could in fact be formed by the profile of a substantially circular inner periphery.

There is also provided a mandrel for a golf club shaft, where the mandrel has an outer surface configured to mate with and provide the above described inner surface of the shaft. This mandrel thus has a grip end roughly sized to be gripped by a person's hands to swing the club, and opposite a head end, with a length of the shaft extending between those two ends. The mandrel comprises a shaft tapering from the larger grip end toward a smaller head end, with the shaft having an outer periphery that is generally circular and further having a first portion that has a polygon outer periphery formed of a plurality of between 4 and 24 flats.

Numerous variations can be made to this basic mandrel, including the preferred variation of a polygon with from 8 to 16 sides and an outer periphery is substantially circular. The mandrel preferably has a polygon with an even number of sides, and the first portion of the length extends for a substantial length of the shaft, either continuously or intermittently. An intermittent spacing of the portions can include a second portion of the length spaced apart from the first section, where the second portion has a cross-section which has a substantially circular outer diameter and a polygon inner periphery formed of a plurality of flats, and where the first and second portions are separated by a portion of the shaft having a generally circular inner diameter. The mandrel preferably has a generally circular inner periphery and a substantially circular outer periphery adjacent the head end of the shaft. The inner periphery of the shaft is advantageously shaped to receive a post of a golf club head.

The flats on the mandrel advantageously each have a width that narrows as the cross-section moves from the grip end of the first portion toward the head end of the first portion. Alternatively, the width of the flats could remain constant. Advantageously, at least a plurality of the flats abut the adjacent flat at a sharp corner, although the at least a plurality of the flats could also abut the adjacent flat at a rounded corner.

There is also provided a method of making a golf club shaft, wherein any one of the above mandrels is wrapped with a composite matrix. The wrapped shaft and composite matrix are subjected to sufficient pressure and sufficiently high temperature to cause the matrix to bind strands in the matrix to form a unitary composite structure. That structure is then separated from the shaft.

There is also provided a shaft means for providing a shaft with areas of varying stiffness extending along at least a substantial portion of the length of the shaft, said shaft means having a cross-section with a substantially circular outer periphery and a polygon inner periphery along said substantial portion.

BRIEF DESCRIPTION OF THE DRAWINGS

These and other features and advantages of the various embodiments disclosed herein will be better understood with respect to the following description and drawings, in which like numbers refer to like parts throughout, and in which:

FIGS. 2b-2c show cross-section taken at 2b-2b and 2c-2c, respectively, of the mandrel of FIG. 1;

FIG. 4 shows a cross-section taken along 3-3 of the mandrel of FIG. 1 wrapped with a matrix;

DETAILED DESCRIPTION

Referring to FIGS. 1-4, a golf club 10 is shown having a shaft 12 along centerline 13 with a grip end 14 at one end and a head 16 at an opposing end. The grip 14 is typically a strip of material wound around the shaft 12, while the head 16 is typically fastened by various mechanical connections, welded or adhered to the shaft 12. The head 16 can be a putter, driver, wedge or various other heads used in golf. The shaft 12 is tapered, being larger at the grip 14 and smaller at the head end 16. The shaft 12 is typically about 0.6 inches outer diameter at the grip 14 and smaller at the head end 16. The shaft 12 is tubular and made of a composite matrix, such as a graphite epoxy matrix in which graphite strands are bound in an epoxy binder material. But other composite matrices could be used, including metal matrix composites including titanium, aluminum, steel and boron in the matrix, usually as the strands rather than the binding matrix, but not necessarily so.

A cross-section of the shaft 12 shows a circular or substantially circular outer periphery along its outer profile, preferably along its entire length. Substantially circular is meant herein as being whatever deviations from a circle are currently allowed by the PGA rules governing the configuration of shafts for golf clubs. The term generally circular encompasses many more rounded variations that substantially circular and encompasses polygons with six or more sides having rounded corners.

The shaft 12 has a plurality of flats 22a extending along a length of the inside of the shaft, as best seen in the cross-sections of FIGS. 1b and 1c, and 4b, 4d, which cross-sections are in a plane orthogonal to longitudinal axis 13. The flats 22a preferably end before the head end of the shaft adjacent head 16. From four to 24 flats 22a are believed suitable, with 8-16 flat sides 22a being preferred. Advantageously, the numbers of flat sides 22a are multiples of two, and preferably multiples of four. The flats 22a preferably extend along a substantial length of the shaft 12, extending from at or adjacent the grip 14 to or adjacent to the head 16.

The flats 22a need not extend that complete distance and can instead extend along any portion and length of the shaft 12. The flats 22a are preferably arranged so that they are adjacent to and parallel to each other, and extend the same length along shaft 12 so the ends of the slots 22a are aligned in a plane orthogonal to longitudinal axis 11. Because the shaft 12 tapers, the width of the flats 22 will also taper from a wider end toward the grip 14 to a narrower end toward the head 16. Alternatively phrased, the flats 22a have opposing sides that are inclined toward each other and toward the head end of the shaft 12. The flats 22a have straight sides providing a width that change at a constant rate. The flats 22a advantageously form chords of a circle.

Figure 1:
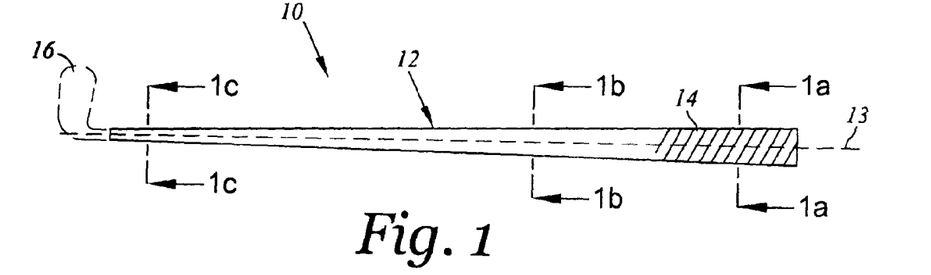
FIG. 1 shows a side view of a mandrel for making golf club shafts.
Figure 1A:
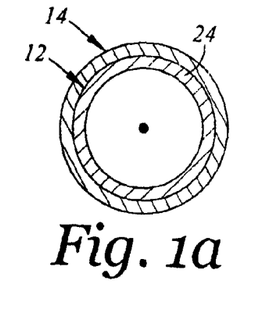
FIGS. 1a-1a, 1b-1b and 1c-1c each show a cross-section taken at 1a-1a, 1b-1b and 1c-1c, respectively, of the mandrel of FIG. 1.
Figure 1B:
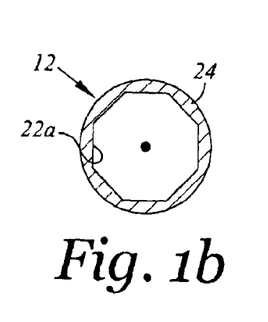
Figure 1C:
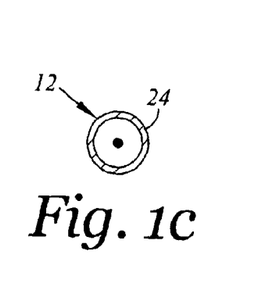
Figure 3:
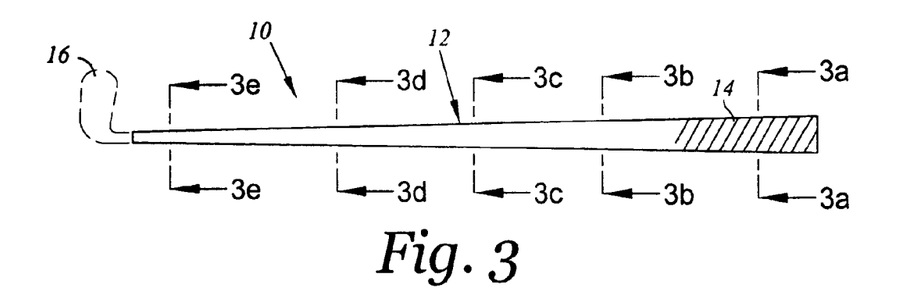
FIG. 3 is a side view of a golf club shaft made using the mandrel of FIG. 4.
Figure 3A:
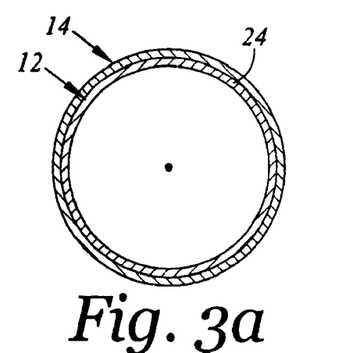
FIGS. 3a-3a, 3b-3b, 3c-3c, 3d-3d and 3e-3e each shows a cross-section taken at 3a-3a, 3b-3b, 3c-3c, 3d-3d and 3e-3e, respectively of the golf club shaft of FIG. 3.
Figure 3B:
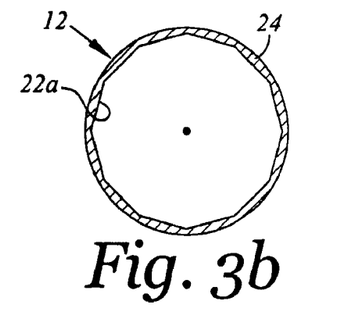
Figure 3C:
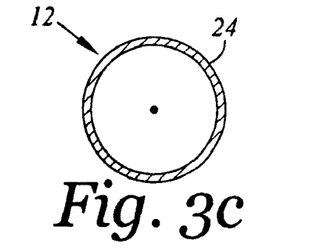
Figure 3D:
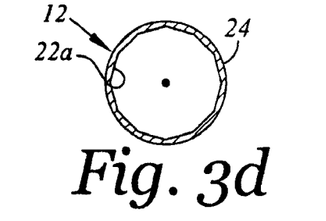
Figure 3E:
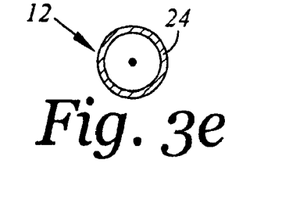

As seen in FIGS. 1c and 3e, the inner profile of the cross-section of the shaft 12 is generally circular adjacent the end of the shaft 12 by the head 16, for a length of about two inches from the end, and possibly longer. The circular inner periphery of the cross-sectional shape at the head end of the shaft 12 could vary to accommodate different mechanisms to fasten heads 16 to shafts 12, as for example, some heads may use a hexagonal (or other shaped) post fitting inside a correspondingly shaped cavity in the mating portion of the shaft.

The body of the shaft 12 has a cross-section with a substantially circular outer periphery and a polygon inner periphery formed by plural flats 22a. The polygonal inner periphery can extend continuously for a substantial length (over half) of the shaft 12, and indeed can extend from the larger end of the shaft below the grip 14 to the smaller end of the shaft at the head 16.

Alternatively, the flats 22a can be discontinuous along their length and separated into two or more segments. It is believed advantageous to have a few lengthy segments rather than numerous short segments, with two segments being preferred. The segments are separated along the length of the shaft 12 by portions having a circular inner periphery in cross-section, as seen in FIGS. 3c and 4c. Advantageously, all of the flats 22a are about the same length so they begin and end together along the length of the shaft 12.

The shaft 12 is made by wrapping a composite material 24 of either strands or sheets around a mandrel 26 having a shape corresponding to that of the inside of the shaft 12 but being longer than the shaft 12 and having a notch 27. Actually, the outer surface of the mandrel 26 shapes the inside of the shaft 12. Thus, the description of the flats 22a also generally applies to the flats 22b on the mandrel 26. The cross-section of the shaft 12 is thus a generally circular on the outside and a polygon on the inside along the portion of the shaft corresponding to the flat-sided portion 22b of the mandrel 24, but preferably with a circular inside diameter adjacent the head end of the shaft.

Figure 4:
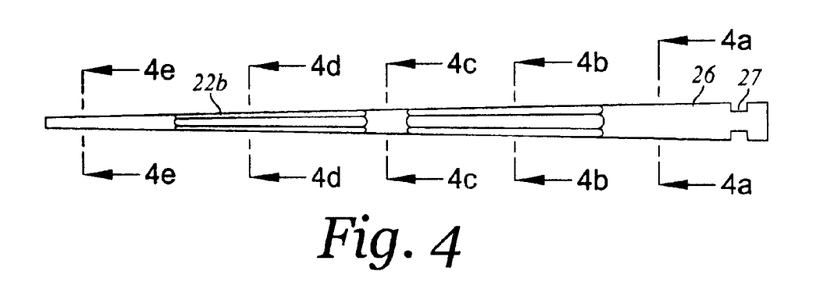
FIG. 4 is a side view of a mandrel for making golf club shafts.
Figure 4A:
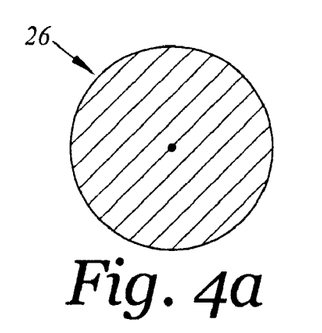
FIGS. 4a-4a, 4b-4b, 4c-4c, 4d-4d and 4e-4e each shows a cross-section taken at 4a-4a, 4b-4b, 4c-4c, 4d-4d and 4e-4e, respectively of the mandrel of FIG. 4.
Figure 4B:
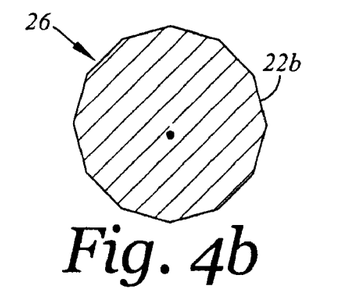
Figure 4C:
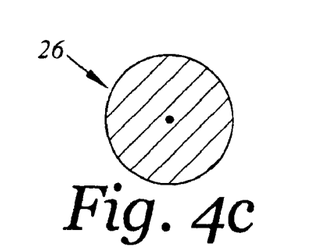
Figure 4D:
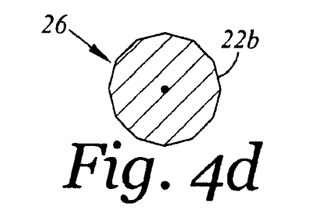
Figure 4E:
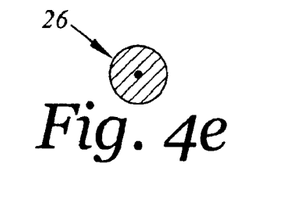
Figure 5:
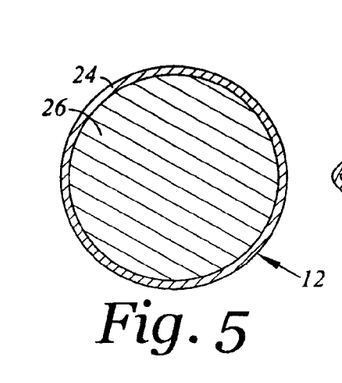
FIG. 5 shows a cross-sectional view of a mandrel and shaft with a circular outer periphery on the mandrel and a circular outer periphery on the shaft.

Referring to FIGS. 1 and 4, the mandrel 26 is typically made of metal, usually steel, tapering from a larger end corresponding to the location of the grip 14 on the shaft 12, and narrowing to a smaller end corresponding to the location of the head on the shaft 12. The mandrel 26 has a series of flats 22b extending along its length, and narrowing in width at a constant rate toward the smaller end of the mandrel. Each flat 22b has two opposing sides that advantageously abut the sides of adjacent flats, with the ends of the various flats terminating together in a plane orthogonal to the longitudinal axis 13. The mandrel 26 has the flats 22b continuous along the length of the mandrel corresponding to the length of the shaft 12, or has the flats 22b intermittent in two or more segments and located to form the desired shape of the inside of the shaft 12.

The mandrel 26 could be formed by casting, but is preferably formed by taking a uniformly tapered shaft with circular cross-section and grinding flats 22b onto the surface of the mandrel. The portions of the mandrel 26 between groups of flats 22b are thus circular, forming a circular inner periphery on the shaft 12, as seen in FIGS. 3c and 4c. Any number of alternating segments of flats 22 and circular sections can be used to provide varying degrees of flexibility and stiffness to the shaft 12.

As the composite 24 is wrapped around the mandrel 26, the inside of the shaft 12 takes the form of the exterior of the mandrel. The composite bends sharply around the corners formed along the sides of the abutting flats 22b. The composite 24 bends at each corner and that corner bend line creates an increase in stiffness of the composite, resulting in a tapered shaft 12 with longitudinally extending but separated lines or areas of increased stiffness (or decreased flexibility) separated by lines or areas of decreased stiffness (or increased flexibility). Varying the number of flats 22a varies the number of lines of increased and decreased stiffness. The shaft 12 described herein, with its various variations on the inside and outer periphery, comprise means for providing a shaft with areas of varying stiffness extending along at least a substantial portion of the length of the shaft. The shaft means has a cross-section with a substantially circular outer periphery and a polygon inner periphery along said substantial portion.

Figure 6A:
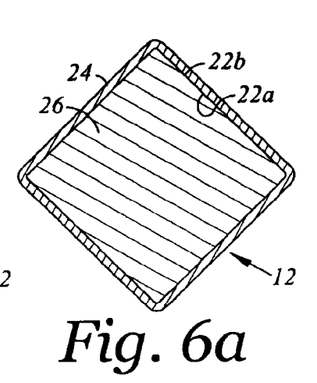
FIGS. 6a-6g each shows a cross-sectional view of a mandrel and shaft with a polygon outer periphery on the mandrel
Figure 6B:
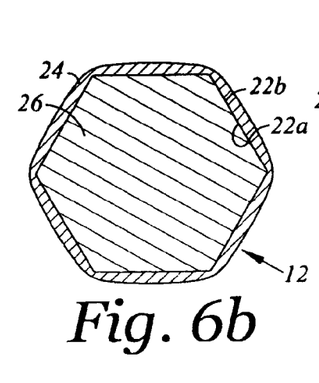
Figure 6C:
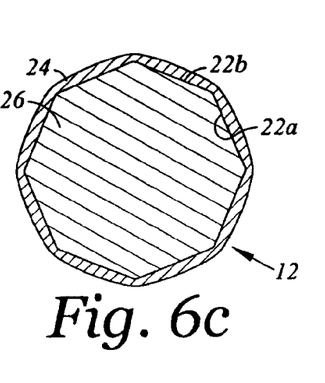
Figure 6D:
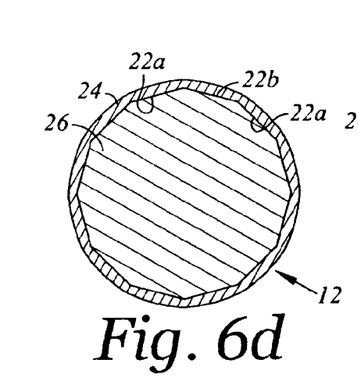
Figure 6E:
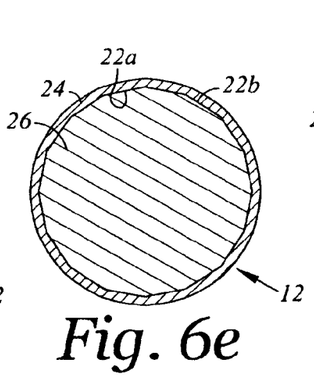
Figure 6F:
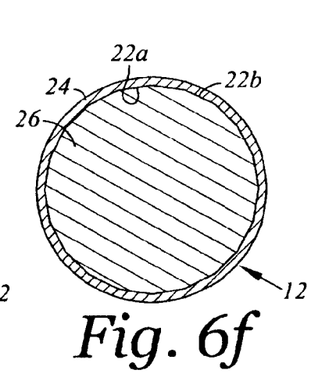
Figure 6G:
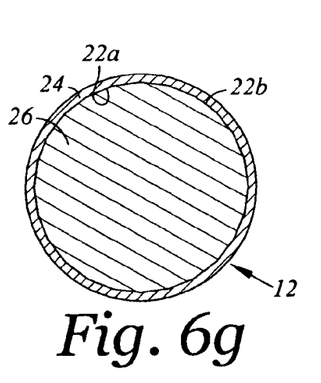

Referring to FIGS. 6a-6g, a plurality of cross-sectional shapes are shown having a plurality of flats varying in number from four flats as in a rectangle or square (FIG. 6a), to six flats as in a hexagon (FIG. 6b), to eight flats as in an octagon (FIG. 6c), to twelve flats as in a dodecagon (FIG. 6d), to 16 flats as in a hexadecagon (FIG. 6e) to 20 flats as in an icosagon (FIG. 6f), to 24 flats as in an icosikaitetragon (FIG. 6g). Thus, mandrels 24 are shown with the number of flats 22b including 4, 6, 8, 12, 16, 20 and 24 flats 22b. As the number of flats 24b on the mandrel increase the correspondingly shaped flats 22a on the inside of the shaft 12 approach a circular cross-section and stiffness variations become less noticeable and the outer periphery is visibly indistinguishable from a purely circular cross-sectional shape. As the number of flats 22a on the inside of the shaft decrease, the inside of the shaft 12 assumes a polygon shape with stiffness variations that vary directionally and with an outer circumference that may visibly deviate from a pure circular cross-sectional shape. For a shaft 12 with a circular inside and outside diameter, the stiffness does not vary along any radial axis orthogonal to centerline 13.

Figure 7A:
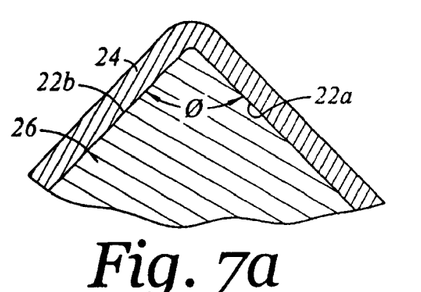
FIGS. 7a-b are segments of a mandrel showing a sharp corner and a rounded corner, respectively.
Figure 7B:
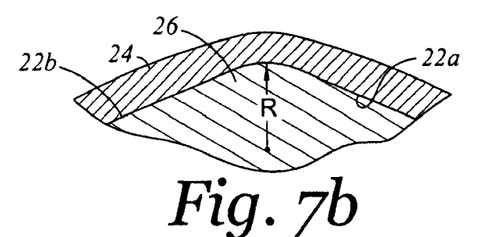

Referring to FIG. 7a, if the corners formed by adjoining flats 22b on the mandrel are too sharp and the included angle θ of the corner is too great, the strands in composite 24 may fracture or incur micro-fractures that could lead to premature failure or reduced strength. The included angle will affect this potential damage to the composite strands more than the sharpness of the corner, and the included angle is greatest if the mandrel 26 has 4-6 flats 22b, where the included angle is 90 degrees for the four sided mandrel and is 60 degrees for the six sided mandrel. But the potential damage and resulting premature failure of the composite matrix also depends on the ductility of the strands, the tension in the strands during wrapping, and the sensitivity of the strands to various failure modes when they are bent around the corners formed by adjoining flats 22b. Thus, in some situations it may be desirable to slightly round the edges extending along the corners formed by the adjoining flats 22b on the mandrel. Alternatively, the flats 22b could be spaced slightly apart so a portion of a rounded periphery of a circular cross-section of the mandrel 26 of radius R separates each flat 22b.

Figure 2:
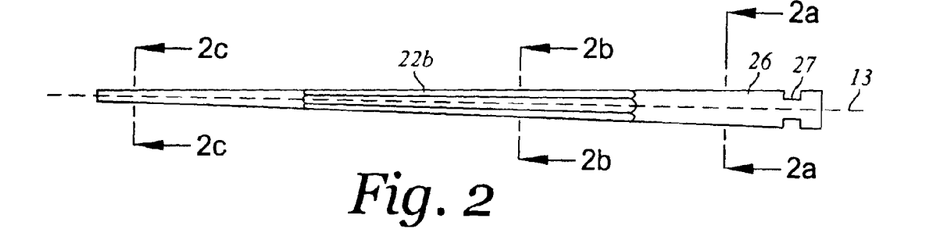
FIG. 2 shows a side view of a golf club shaft formed using the mandrel of FIG. 1.
Figure 2A:
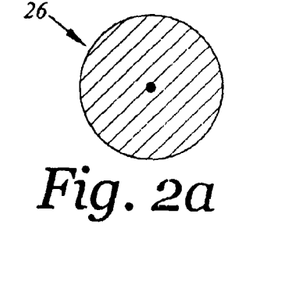
FIGS. 2a-2a, 2b-2b and 2c-2c each shows a cross-section taken at 2a-2a, 2b-2b and 2c-2c, respectively, of the shaft of FIG. 2.
Figure 2B:
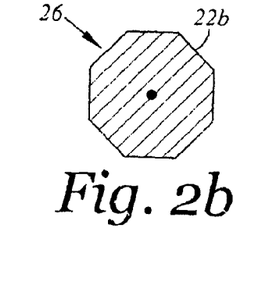
Figure 2C:
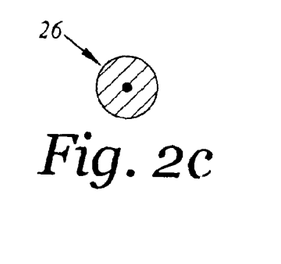
Figure 8:
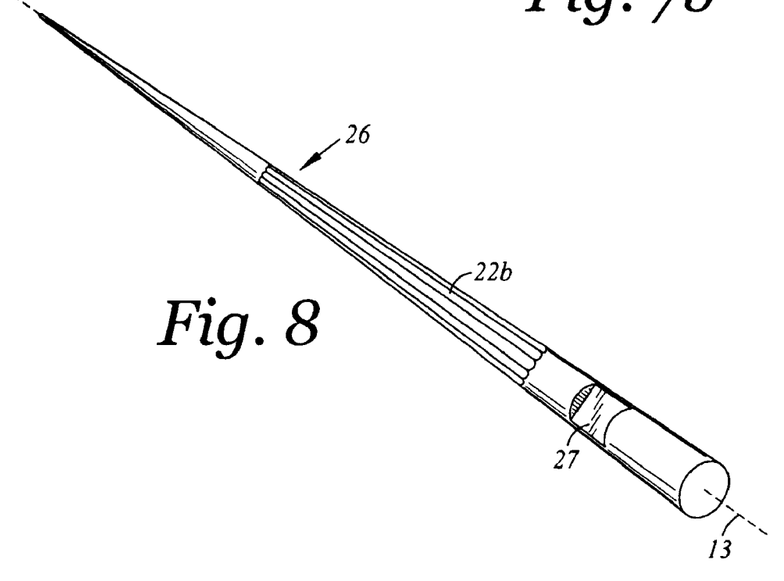
FIG. 8 is a perspective view of a mandrel with tapering flats.

Referring to FIGS. 2, 4, and 8a, the flats 22b on the mandrel preferably have a tapered width that varies along the length of the tapered mandrel 26 so that the sides of the flats always abut. It may be advantageous to have the flats 22b with a predetermined maximum width, or maximum cord length, so that the flats 22b become separated by the curved portions of the tapered mandrel 26 as the flats extend toward the larger end forming the grip 14.

Because the shaft 12 has longitudinally extending lines of variable stiffness, it may be advantageous to align the head 16 with a line of stiffness, or a line of flexibility. The flats 22a on the shaft are preferably even in number so a plane of symmetry can extend through the centerline 13 and also extend through the stiffest portions on opposing sides of the shaft 12, or it could extend through the most flexible portions on opposing sides of the shaft. A head 16 could have its plane of symmetry, or line of motion aligned with the plane of symmetry through the shaft 12, and thus orient the head relative to the shaft to take advantage of the shaft stiffness as seems most beneficial. Further, a plane of symmetry of the shaft 16 can be aligned with a plane of orientation of head 16, but can also be offset at any desired angle. Offsetting may help compensate for the tendency of a user to consistently hook or slice the ball.

In a further embodiment, the flats extend along a first length extending from or adjacent to the gripping end of the shaft 12 toward a portion in the middle of the shaft, with a circular middle section and a second length of flats extending from the middle section toward the head end of the shaft but preferably changing to a circular section adjacent the head end of the shaft.

There is also provided a method A method of making a golf club shaft having a grip end opposite a head end and defining a length of the shaft extending between those ends. The method includes, wrapping a composite matrix around any of the above described shafts 12, subjecting the wrapped shaft and composite matrix to pressure and increased temperature sufficient to cause the matrix to bind strands in the matrix to form a unitary structure; and separating the unitary composite structure from the shaft. Often a release agent is applied to the outside of the mandrel so the cured composite matrix separates more easily from the mandrel. The mandrel is then cleaned and the process repeated. The composite matrix can comprise separate strands of unidirectional filament wound around the mandrel 26, but preferably a pre-impregnated tape of multiple strands is sued, or wedge-shaped sheets of pre-impregnated matrix are used. The application of temperature and pressure to cure the matrix is known, and not described in detail. It can include wrapping the parts in a gas-tight enclosure, such as a plastic wrap, and then placing the parts in an oven where the pressure is reduced and the parts are baked at elevated temperature until the composite matrix is cured, or placing the parts in a heat-shrinkable wrap which is heated to compress the matrix against the mandrel, after which the parts are placed in an oven to heat and cure the composite matrix.

Figure 9:
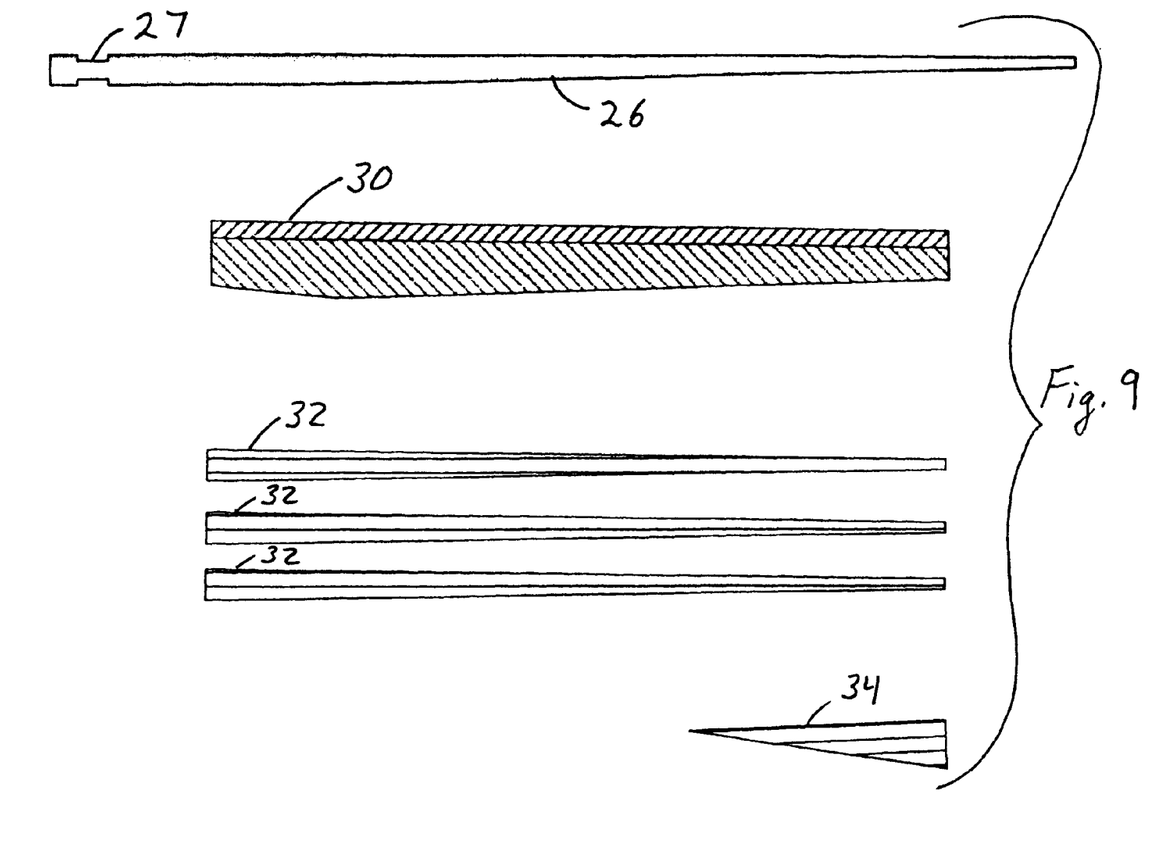
FIG. 9 is a plan view of a typical lay-up sequence for a shaft on a mandrel.

Referring to FIG. 9, the lay-up of a typical shaft 12 is described. A first layer 30 of composite matrix is placed along a pre-selected portion of the mandrel 26. This first layer 30 typically has a bias construction of at least two separate layers of unidirectional filaments oriented at an angle to each other, typically 45° and typically not aligned with the direction of the longitudinal axis 13 of the shaft 12. Various bias angles can be used. A plurality of unidirectional layers 32 are then applied on top of the first layer 30, with the unidirectional filaments oriented along the longitudinal axis 13 of the shaft 12. A tip layer 34 is optionally added to the top unidirectional layer 32, at the end of the shaft 12 that will fasten to the head 16 (FIG. 1). Depending on the manufacturer and the desired performance, these layers can be altered and additional layers of different shapes and orientations or bias can be added.

A shaft 12 with a cross-section having a polygon interior profile is believed to have higher bending strength, at least along certain planes as discussed above. A torsional resistance is also believed possible, in part because the polygon shapes do not react torsional forces as uniformly as would a perfectly circular tubular shaft. Thus, a shaft 12 is believed capable of having a lighter weight, increased stiffness, improved hoop strength and lower torque. By altering the bending stiffness of the shaft 12 along the entire shaft length, or by altering the bending strength in any given region or regions, the performance of the club head 16 can be varied. Desirable variations include varying the amount of backspin and launch velocity on a golf ball driven with such a club, to vary the carry distance of the ball and the travel distance on the ground.

With a shaft 12 having a cross-section with circular inner and outer periphery the stiffness is varied by varying the diameter and applying thicker layers of composite matrix, or altering the layering of the strands or the orientation and lay-up of the strands. Changing the fiber pre-impregnated unidirectional tape or filament winding can alter the weight, balance point and can alter the high frequency travel of forces throughout the shaft 12, but the "feel" of the club is often undesirable. Further, changes in the composite filament can significantly affect costs, especially if a stiffer filament is used.

The performance of a shaft 12 depends on the stiffness K and inertia I. For a given cross-sectional area of the shaft 12, the cost of the materials to make the shaft is approximately the same. For a shaft 12 made of the same composite matrix, the modules of elasticity E is the same. But the stiffness K and especially the inertia I can be varied by altering the shape of the shaft's cross-section, with the inertia and stiffness being greatly influenced by portions of the shaft located the greatest distance from the centerline 13 of the shaft. The inertia and stiffness typically vary exponentially with the distance from the centerline. For a circular cross-sectional area, the stiffness and inertia are uniformly the same distance from the centerline 13 since the shaft encircles the centerline. But for a non-circular cross-section, parts of the cross-section can be either closer or further from the centerline than in a corresponding circular cross-section. It is thus believed possible that for a given cross-sectional area, an increased stiffness can be achieved. For a given cross-sectional area with a square cross sectional shape compared to a circular cross-sectional shape, the increase in stiffness and/or inertia of about 25% is believed possible, while for inner peripheries with 26-16 flat interior sides, an increase of about 4% is believed possible, and the increase decreasing as the number of interior sides increase and the shape approaches a circular inner and outer periphery. Nonetheless, a 4% increase in stiffness for a given cross-sectional area (and thus a given weight), and the ability to very the stiffness, is believed to offer desirable advantages.

The above description is given by way of example, and not limitation. Given the above disclosure, one skilled in the art could devise variations that are within the scope and spirit of the invention disclosed herein, including various ways of spacing the segments or groups of flats 22b on the mandrel 26 and the resulting flats 22a on the shaft 12. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A golf club shaft having a grip end opposite a head end and defining a length of the shaft extending between those two ends, comprising:
a tubular composite matrix shaft tapering from a larger grip end toward a smaller head end, the shaft having a cross-section over a first portion of the length which cross section has a generally circular outer periphery and a polygon inner periphery formed of a plurality of between 16 and 24 flats with rounded corners joining the flats, the shaft having a second cross-sectional shape extending over the head end of the shaft, with the second cross-sectional shape having a generally circular outer periphery and a generally circular inner periphery.

2. The golf club shaft of claim 1, wherein the polygon has an even number of sides.

3. The golf club shaft of claim 1, wherein the first portion of the length extends for a substantial length of the shaft.

4. The golf club shaft of claim 1, further comprising a second portion of the length spaced apart from the first portion section, the second portion having a cross-section which has a substantially circular outer diameter and a polygon inner periphery formed of a plurality of flats, the first and second portions being separated by a portion of the shaft having a generally circular inner diameter.

5. The golf club shaft of claim 1, wherein the shaft has a generally circular inner periphery and a substantially circular outer periphery adjacent the head end of the shaft.

6. The golf club shaft of claim 1, wherein each flat has a width that narrows as the cross-section moves from the grip end of the first portion toward the head end of the first portion.

7. The golf club shaft of claim 1 wherein there are 16 flats of substantially equal length when measured in a plane orthogonal to a longitudinal axis along the length of the shaft.

8. The golf club shaft of claim 1 wherein the cross-sectional shape of the shaft between each flat and the corresponding outward circular outer periphery of the shaft, is the same.

9. A golf club shaft having a grip end opposite a head end and defining a length of the shaft extending between those ends, comprising:

shaft means for providing a shaft with areas of varying stiffness extending along at least a substantial portion of the length of the shaft, said shaft means having a cross-section with a substantially circular outer periphery and a polygon inner periphery along said substantial portion, the polygon inner periphery having from 16 to 24 flats joined at rounded corners, the shaft means including a cross section with a circular inner and outer periphery at the head end of the shaft.

10. The golf club shaft of claim 9, wherein said shaft means is made of a composite matrix.

11. The golf club shaft of claim 9 wherein the shaft means has 16 flats of substantially equal length when measured in a plane orthogonal to a longitudinal axis along the length of the shaft.

* * * * *